United States Patent
Burge (10) Patent No.: US 9,705,835 B2
(45) Date of Patent: Jul. 11, 2017

(54) COLLABORATION MANAGEMENT SYSTEMS

(71) Applicant: John Richard Burge, Hermosa Beach, CA (US)

(72) Inventor: John Richard Burge, Hermosa Beach, CA (US)

(73) Assignee: PANDEXIO, INC., Hermosa Beach, CA (US)

( * ) Notice: Subject to any disclaimer, the term of this patent is extended or adjusted under 35 U.S.C. 154(b) by 190 days.

(21) Appl. No.: 14/070,667

(22) Filed: Nov. 4, 2013

(65) Prior Publication Data

US 2014/0129639 A1 May 8, 2014

Related U.S. Application Data

(60) Provisional application No. 61/722,033, filed on Nov. 2, 2012.

(51) Int. Cl.
*G06F 15/16* (2006.01)
*H04L 12/58* (2006.01)

(52) U.S. Cl.
CPC .................................. *H04L 51/32* (2013.01)

(58) Field of Classification Search
CPC ....... H04L 51/32; H04L 12/581; H04L 29/06; G06Q 10/10
USPC .......................... 709/204, 205, 217, 218, 219
See application file for complete search history.

(56) References Cited

U.S. PATENT DOCUMENTS

| | | | |
|---|---|---|---|
| 7,577,689 B1 * | 8/2009 | Masinter et al. | |
| 8,543,665 B2 | 9/2013 | Ansari et al. | |
| 8,769,012 B1 * | 7/2014 | Shah et al. | 709/204 |
| 2005/0209923 A1 * | 9/2005 | Jablonski et al. | 705/14 |
| 2006/0041589 A1 * | 2/2006 | Helfman | G06F 17/3089 |
| 2006/0123347 A1 * | 6/2006 | Hewitt et al. | 715/748 |
| 2006/0282762 A1 * | 12/2006 | Diamond | G06F 17/241 715/235 |
| 2007/0078709 A1 * | 4/2007 | Rajaram | 705/14 |
| 2007/0294614 A1 * | 12/2007 | Jacquin et al. | 715/512 |
| 2009/0144392 A1 * | 6/2009 | Wang | G06Q 10/10 709/217 |

(Continued)

OTHER PUBLICATIONS

"Google Docs Integration Added to Podio's Work Platform", Podio, Press Release, Copenhagen, Feb. 16, 2012.

(Continued)

*Primary Examiner* — Liangche A Wang
*Assistant Examiner* — Kaylee Huang
(74) *Attorney, Agent, or Firm* — Fish & Tsang, LLP (57) ABSTRACT

Systems, configurations, and methods of managing collaboration of content are disclosed. A content collaboration system can be configured to manage collaborating subject matter within one or more activity streams. A user can create a new collaboration object associated with particular content using the content collaboration system. The content collaboration system is configured to format data related to the collaboration object according to the different activity stream formats and to insert the formatted data into the one or more activity streams. Other users are allowed to collaborate around the particular content on the different activity streams. The content collaboration system is configured to update the collaboration object according to the collaboration on the different activity streams.

17 Claims, 4 Drawing Sheets

(56) References Cited

U.S. PATENT DOCUMENTS

| | | |
|---|---|---|
| 2009/0192845 A1* | 7/2009 | Gudipaty et al. .................. 705/7 |
| 2010/0257457 A1* | 10/2010 | De Goes ........................ 715/751 |
| 2010/0269029 A1* | 10/2010 | Siegel ................. G06F 3/04883 |
| | | 715/205 |
| 2012/0265808 A1 | 10/2012 | Ezell et al. |
| 2013/0046822 A1 | 2/2013 | Noble et al. |
| 2013/0103757 A1 | 4/2013 | Mitchell et al. |
| 2013/0132385 A1 | 5/2013 | Bullotta et al. |
| 2013/0198290 A1 | 8/2013 | Thomas |
| 2013/0311598 A1* | 11/2013 | Arrouye et al. .............. 709/217 |

OTHER PUBLICATIONS

"Modeling Paradata and Assertions as Activity Streams", US Advanced Distributed Learning Initiative: CC-BY-3.0, vol. 2.0.1, 2011.

* cited by examiner

COLLABORATION MANAGEMENT SYSTEMS

This application claims the benefit of U.S. provisional application No. 61/722,033 filed Nov. 2, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is collaboration management systems.

BACKGROUND

The following description includes information that may be useful in understanding the present invention. It is not an admission that any of the information provided herein is prior art or relevant to the presently claimed invention, or that any publication specifically or implicitly referenced is prior art.

Information in electronic form (e.g., digitally stored documents, images, and other digital data, etc.) is becoming more available, allowing more ways to collaborate on shared data. Historically, digital data has been shared among knowledge workers (e.g., office staffs, students, professors, attorneys, researchers, etc.) via emails and shared file repositories. As social networks are coming into widespread use, these knowledge workers have sought to incorporate this new medium into existing architecture for collaboration of shared data.

For example, U.S. patent publication 2012/0265808 to Ezell et al. entitled "Contextual Collaboration", filed Apr. 15, 2011, discloses a system for allowing participants to contribute to an activity stream via multiple different medium (e.g., phone call, e-mails, etc.). Thus, when a first participant initiated an activity stream for collaboration on a project via a first media (e.g., a social network), a second participant can contribute to the activity stream via a second media (e.g., a text message).

U.S. patent publication 2013/0046822 to Noble et al. entitled "Method and System for Managing a Virtual Actionable Conversation", filed Aug. 16, 2011, discloses a social activity stream application for managing virtual actionable conversations that allows participants in a conversation to request actions to be performed in various external systems. This way, conversation participants may use a single application to monitor and request actions in multiple external systems.

Many software companies such as Google®, Jive Software®, Yammer®, Chatter®, Central Desktop®, and Wrike® offer activity stream as a project collaboration and management tool.

Other efforts that have been made in this area include:
U.S. Patent Publication 2013/0103757 to Mitchell et al. entitled "Generation of Activity Stream from Server-side and Client-side data", filed Oct. 19, 2011;
U.S. Pat. No. 8,543,665 issued to Ansari et al. entitled "Multi-Services Application Gateway and System Employing the Same", filed Dec. 31, 2007;
U.S. Patent Publication 2013/0132385 to Bullotta et al. entitled "Method for Analyzing Time Series Activity Streams and Devices Thereof", filed Nov. 15, 2012; and
U.S. Patent Publication 2013/0198290 to Thomas entitled "Real-Time Communication and Information Collaboration System", filed Jul. 7, 2010.

However, the above-mentioned publications require a proprietary active streaming system that allows only pre-identified participants to contribute to the project. Thus, there is still a need to provide an effective collaboration management system that leverage existing social networks.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which multiple collaborators can collaborate in relation to document content.

In one aspect of the inventive subject matter, document content can be copied, extracted, derived or otherwise obtained via a digital file, and inserted directly within an activity stream, or webpage having an activity stream. Two or more users can see the obtained content and collaborate relating to the document directly within the activity stream or webpage. In a preferred aspect of some embodiments, the obtained content can be viewed without opening a separate viewer or other widget.

In another aspect of the inventive subject matter, a collaboration management system comprises at least two of a collaboration database, activity stream interface, collaboration engine, and collaborator interface.

The collaboration database can be any suitable database configured to store collaboration objects. Collaboration objects are portions of electronically stored documents or files that include metadata and one or more collaboration point links.

The activity stream interface can comprise any suitable interface configured to acquire activity stream data representative of an activity stream. Activity stream data can include updated metadata of a collaborative object, updated link of a collaborative object, or any other relevant data.

The collaboration engine can be coupled with one or more collaboration databases and activity stream interfaces. The collaboration engine can be configured to perform one or more functions, among other functions: receiving data (e.g., activity stream data, etc.); identifying formats (e.g., activity stream format from received data, etc.); locating integration points (e.g., an integration point within an activity stream located based on received data, etc.); obtaining collaboration objects (e.g., from a collaboration database, etc.); formatting a collaboration object for insertion into a webpage or activity stream; integrating the formatted collaboration object to an integration point via an interface; and launching a viewer (e.g., a collaboration object viewer, etc.).

The collaborator interface can comprise any suitable user interface that allows multiple collaborators to view, collaborate in relation to, or otherwise access a formatted collaboration object. For example, the collaborator interface can allow users to annotate (e.g., highlight, underline, strikethrough, point to, etc.) delete or add letters, numerals or image data, comment on, or perform any other modification to the formatted collaboration object.

The collaboration engine can be configured to additionally or alternatively perform one or more of the following functions, among others, to utilize a collaboration relating to the formatted collaboration object: modifying collaboration objects (e.g., updating metadata based on activity stream data, including annotations, including changes made to the image or data content of collaboration objects, etc.); merging user made modifications to the collaborative object, which can include resolving merge conflicts (i.e., revision control); and updating metadata of collaborative objects.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, host, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The present inventive subject matter is drawn to systems, configurations, and methods for managing collaboration of content within one or more activity streams. In one aspect of the inventive subject matter, collaboration content can be copied, extracted, derived or otherwise obtained via a digital file, and inserted directly within the one or more activity streams. Two or more users can see the obtained content and collaborate relating to the collaboration content directly within the one or more activity streams.

As used herein, the collaboration content can include any content data on which participants would like to collaborate, such as text data (e.g., an article, a website, a document, a publication, a study, a textbook, a magazine, etc.), image data, video data, and/or audio data.

An activity stream includes formatted digital data that represents a series or list of activities performed by one or more individuals (owners of the activity stream) on one or more associated websites or other digital document domains. In some embodiments, an activity stream manager (a server or activity stream host) is configured to manage multiple activity streams for different owners. The activity stream host can be configured to allow the owners to view and/or edit their respective activity streams (e.g., adding entries to the stream, removing entries to the stream, editing entries within the stream, etc.). In some embodiments, the activity stream manager is configured to monitor activities of the owners and automatically update the activity streams accordingly. In addition, the activity stream manager is also configured to publish the activity streams on a website, so that they can be shared with other users of the website. When the activity streams are published, the activity stream manager can also be configured to allow other users (non-owners) to contribute to different entries in the activity streams (e.g., add comments, indicate 'like", etc.). The activity stream can be a forum, a message flow, a comment section of a forum, a project management application, a revision control application, an online document, or a website.

A variety of social network websites (e.g., Facebook®, Google+®, Twitter®, LinkedIn®, or MySpace®, or other social blogs) allow their users to publish personalized activity streams on their websites. Additionally, enterprise collaboration websites (e.g., Yammer®, Jive®, Chatter®, Box.net®, Sharepoint®, Huddle®, Socialcast®, Socialtext®, SalesForce®, etc.), and other business-related applications also feature activity streams that allow users to publish activity streams and collaborate on entries within the activity streams. As such, non-owners (e.g., friends of the owner, co-workers of the owner) can also subscribe to the owner's activity stream and contribute to entries within the owner's activity stream.

Figure 1:
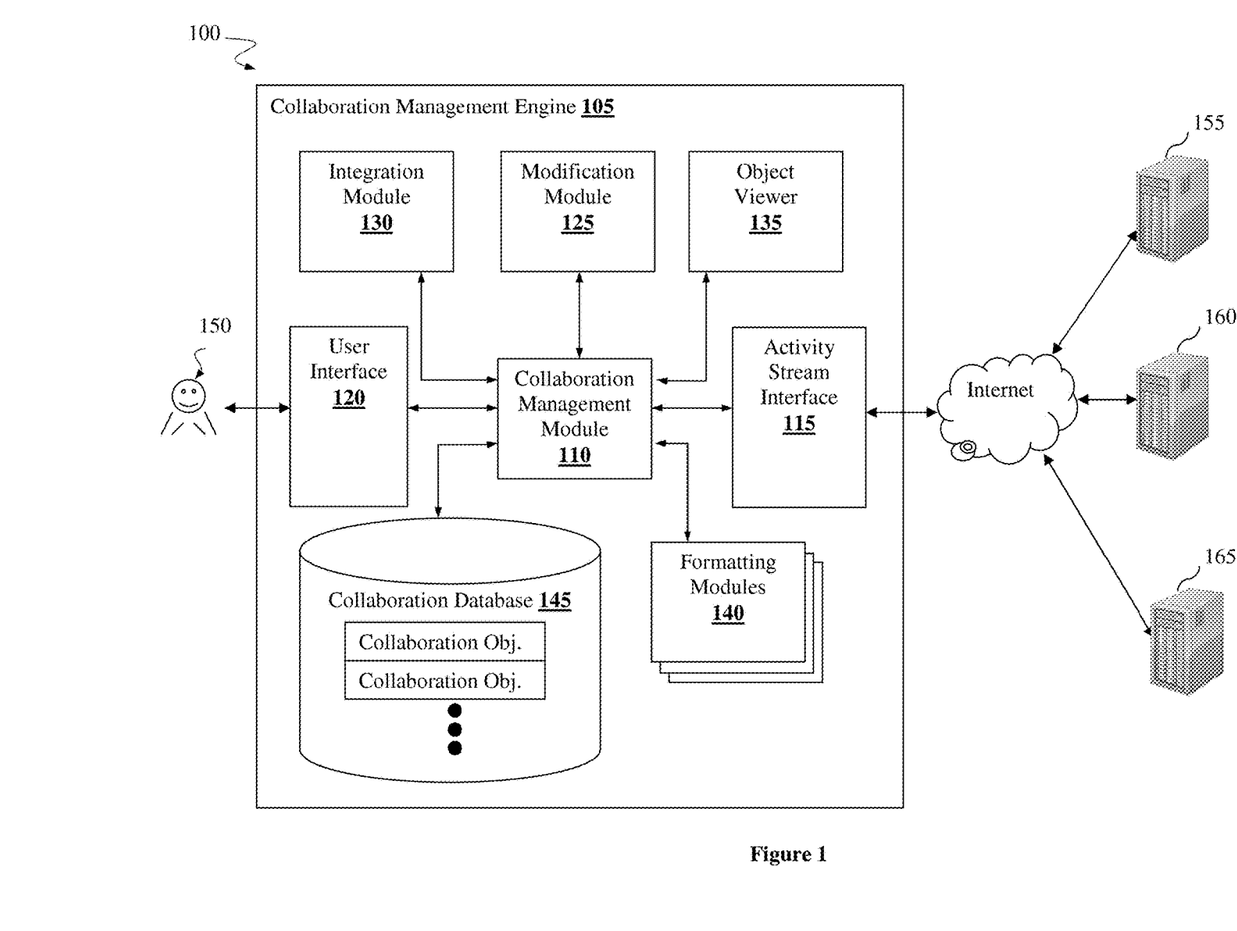
FIG. 1 is a schematic of a collaboration system capable of providing a nexus of collaboration among multiple activity streams.

FIG. 1 conceptually illustrates a collaboration management system 100 of some embodiments that manages the collaboration of content on multiple activity streams. The collaboration management system 100 includes a collaboration management engine 105 and a collaboration database 145. The collaboration database 145 can be implemented either as part of the collaboration management engine 105, or can be separated from, but communicatively coupled with, the collaboration management engine 105. In some embodiments, the collaboration database 105 includes non-transitory permanent data storage such as a hard drive, a flash memory, etc.

The collaboration engine 105 can be part of a mobile phone application, a computer application, a mobile device (e.g., a smart phone, a tablet, a laptop), a web browser, a web services server, or other suitably configured computing device.

The collaboration management engine 105 includes a collaboration management module 110, an activity stream interface 115, a user interface 120, a modification module 125, an integration module 130, an object viewer 135, and a set of formatting modules 140. In some embodiments, the collaboration management module 110, the activity stream interface 115, the user interface 120, the modification module 125, the integration module 130, the object viewer 135, and the set of formatting modules 140 are software modules or stand-alone applications that can be executed by a set of processing units (e.g., processor, processing core, etc.) to perform the functions described herein.

In some embodiments, the collaboration management engine 105 interacts with user 145 via the user interface 120. In some of these embodiments, the user interface is a graphical user interface (GUI) (e.g., a webpage) generated by the collaboration management module 110 and a HTTP server (not shown) for interacting with the user 145. The graphical user interface can be presented via a web browser or the interface of an operating system within a computing device (e.g., a personal computer, a laptop, a mobile phone, a tablet, etc.).

The user interface 120 allows the user 145 to select (or clip) content from a document (e.g., a text document, a website, a digital image library, an audio file, a video file, etc.) that is of interest to the user. For example, the user interface 120 can include a button or a special short cut key that allows the user 145 to initiate the content selection process. Once initiated, the user can select the portion of the content from the document by "blocking" the portion of the content using the cursor (or using a finger on a touch-sensitive display). The selected content can represent the entire or a portion of the document. In some embodiments, the user 145 can select content that is intended to be subsequently collaborated by a group of people. The content can be selected from documents that is stored on the user's computing device or from other storage that is accessible (e.g., through a network connection) by the user (e.g., a website on the Internet, a file stored in a cloud storage device, etc.). In some embodiments, the content is selected from a read-only portion of a document such that the portion of the document cannot be edited by an application.

Figure 2:
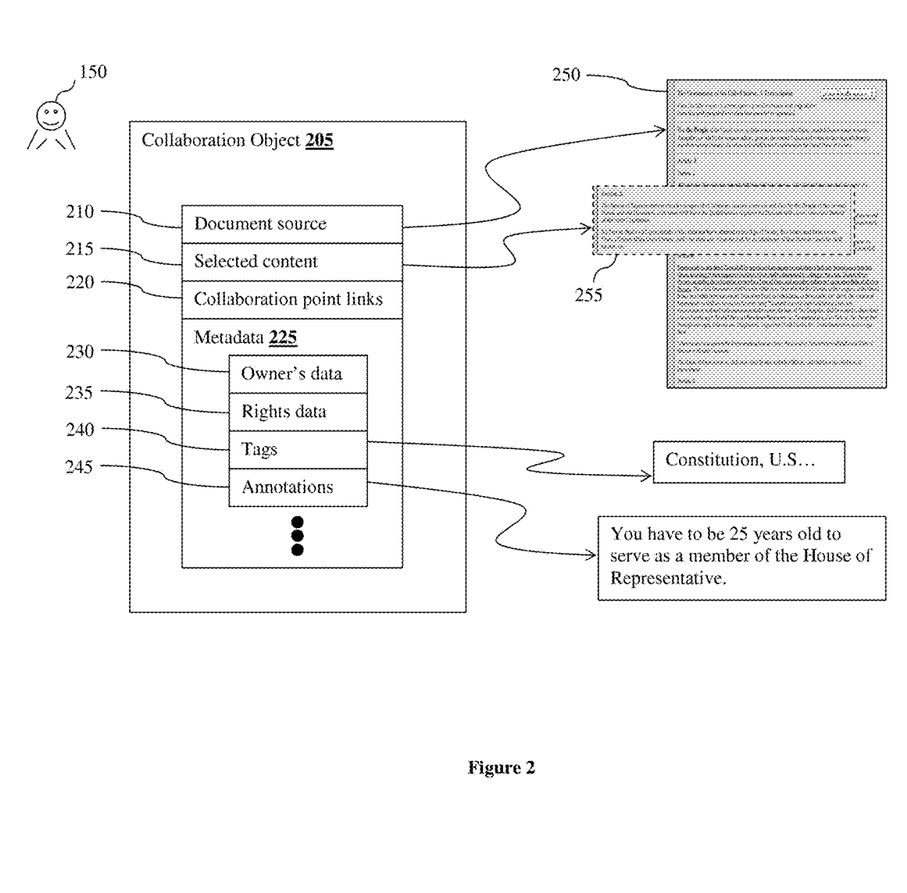
FIG. 2 provides an illustrated example of a collaboration object.

Once the user 105 has selected the content, the collaboration management module 110 creates or otherwise instantiates a collaboration object for the selected content and stores the collaboration object in the collaboration database 145. The instantiated collaboration object represents a digital construct within a computer readable memory. FIG. 2 illustrates an example collaboration object 205 created by the collaboration management module 110 after the user 150 has selected content through the user interface 120 of the collaboration engine 105. In a sense, the user 150 is the owner of the collaboration object 205, and the collaboration engine 105 allows the owner 150 of the collaboration object 205 to fully manage the newly instantiated collaboration object 205.

The collaboration object 205 can include different data related to the content selected by the user. For example, collaboration object 205 includes document source 210, selected content 215, a set of collaboration point links 220, and metadata 225 associated with the selected document. The document source 210 includes an identifier that can identify (and preferably direct a user to) the source document (e.g., source document 250) from which the content is selected. Preferably, the document source 210 includes at least one of a uniform resource locator (URL), a uniform resource identifier (URI), an IP address, a file name, an object reference, or other pointer.

The selected content 215 includes the portion of the content that the user selected from the source document 250. Preferably, the selected content 215 includes a clipped image 255 of the selected portion of the source document 250. If the selected content includes text, the selected content data field 215 (or another data field such as the metadata section 225 within the collaboration object) in a preferable embodiment would also include the selected portion of the document in a text format that is derived from the selected content via character recognition technologies such as OCR.

The collaboration object 205 can also include a set of collaboration point links. The collaboration point links can point to different locations within the source document, preferably locations within the selected content. The set of collaboration point links include at least a first collaboration point links that indicates a location, within the source document, the portion of the source document 250 from which the content is selected. The first collaboration point link includes at least one of a uniform resource locator (URL), a uniform resource identifier (URI) an IP address, a file name, an object reference, and a link that directs to the portion of the document from which the content is selected.

Each collaboration point link can also be associated with an annotation 245 and/or tag 240. An annotation can be a fact, an opinion, an assertion, a comment, or a conclusion that a user (the owner 150 or any other user who contributes to this collaboration) generates based on the selected content 215. Each associated tag and annotation also contains information to indicate the creator of the tag and assertion. For example, when the owner 150 makes an assertion based on the selected content 215, the collaboration management module 110 will create an annotation that includes the assertion made by the owner 150. The collaboration management module 110 will also associate that annotation with the first collaboration point link, and include the annotation within the collaboration object 205.

In addition to the first collaboration point, the set of collaboration points can include other collaboration points created by the owner and/or other users, which will be explained in more detail below.

In some embodiments, the collaboration management module 110 automatically generates metadata (e.g., timestamp, rights data, owner's data, etc.) when the collaboration object is created. The timestamp includes the time that the collaboration object is created and the time that the collaboration object is last modified. The owner's data 230 includes information that identifies the owner (creator) of the collaboration object 205 (in this example, the owner's data identifies user 150 as the owner of this collaboration object 205). The rights data 235 includes access control information such as which user has the right to view content of the collaboration object 205 and which user has the right to contribute to the collaboration object 205.

In some embodiments, the collaboration object 205 is a separate entity from the document 250 from which the associated content 255 is selected. Thus, the viewing and modifying (i.e., collaborating) of the collaboration object (and the associated content) has no effect to the original document from which the content is selected.

Referring back to FIG. 1, once the collaboration management module 110 has created or otherwise instantiated a new collaboration object (e.g., collaboration object 205), the collaboration management module 110 will store the collaboration object 205 into the collaboration database 145, along with other collaboration objects created for different users. Different collaboration objects can be associated with different content selected by the users.

Automatically or upon instructions from the user 150, the collaboration engine 105 can publish data of the collaboration object 205 associated with the collaboration object 205 by inserting the data into one or more activity streams. The data to be published in the one of more activity streams can include the selected content 215, the collaboration point links and associated tags and/or annotations, and other metadata. To insert data to an activity stream can include several steps to be performed by the collaboration management engine 105. First, the collaboration management module 110 acquires activity stream data from one or more activity stream host websites 155, 160, and 165. Examples of activity stream host websites include social networking websites such as Facebook®, MySpace®, Twitter®, and other proprietary activity stream host servers. The activity streams can be associated with the owner 150 of the collaboration content or an organization (e.g., a company, a department, a group) to which the owner 150 belong. Preferably, the collaboration management module 110 authenticates the user 150 with the activity stream hosts 155, 160, and 165 before retrieving the activity stream data.

Each of the activity stream hosts can be independent from each other, and the activity streams from the different hosts can be all different from each other. As different hosts use different activity stream data format to represent their respective activity streams, the collaboration engine 105 of some embodiments then identifies an activity stream format of the activity stream data.

As mentioned above, the collaboration management engine 105 also includes a set of formatting modules 140. The set of formatting modules 140 can be configured to detect the format of an activity stream, and to convert data (e.g., data of a collaboration object) into a format that is compatible with the format of the activity stream. Thus, the collaboration management module 110 in some embodiments uses the formatting modules 140 to identify the activity stream formats of the activity stream data that is received from hosts 155, 160, and 165.

Next, the collaboration management module 110 obtains the collaboration object 205 and uses the one or more formatting modules 140 to format the data of the collaboration object 205 according to the formats identified for the received activity stream data. Different embodiments of the formatting modules 140 use different techniques to format the collaboration object data. In some embodiments, the formatting modules 140 format the collaboration object data according to a particular markup template using a markup language such as HTML or XML. In other embodiments, the formatting modules 140 format the collaboration object data using a tagging template such as RSS or ATOM. In yet some other embodiments, the formatting modules 140 format the collaboration object data using an application programming interface (API) provided by the activity stream host.

In some embodiments, the formatting modules 140 insert, into the activity stream data, a set of programming code (e.g., JavaScript) comprising an identifier for the collaboration object 205 that when executed by the activity stream host would pull (or snip) presentation and content data from the collaboration management engine 105 (possibly from the collaboration database 145 or some other data storage). This can be accomplished by configuring an AJAX request to request the snip JSON from the collaboration management engine 105. Once the programming code has retrieved the collaboration object data from the collaboration management engine 105, it will transform the JSON snip data into HTML, add hyperlinks that link to the viewer application capable of viewing the document containing this snip, and insert the final HTML into the activity stream markup.

In addition, the collaboration management module 110 also uses the integration module 130 to identify (or locate) an integration point for integrating the formatted collaboration object data within each of the activity streams. In some embodiments, the integration module 130 can automatically identify the integration point based on the activity stream data. For example, the activity stream data can include metadata indicating that all new activities should be pushed to the front (or the back) of the stream data. Alternatively, the user 150 can inform the integration module 130 via the user interface 120 the desired integration point (e.g., the user wants to insert the content at a particular location of the activity stream). It is contemplated that a different integration point can be used for the different activity streams.

The integration module 130 then generates a new activity stream entry for each of the activity streams based on the formatted collaboration object data, and integrates the new entries into the activity streams according to the identified integration points. The collaboration management module 110 thereafter sends the updated activity stream data back to the respective hosts 155, 160, and 165 via the activity stream interface 115.

In some embodiments, the collaboration management module 110 also uses the object viewer module 135 to embed programming code of a viewer application, possibly based on HTML5, as part of the entry into the activity streams. The programming code instructs the hosts 155, 160, and 165 to launch the viewer application when rendering and presenting the entry as part of the activity streams. This viewer application allows other users to view content of the entry (e.g., the selected content such as text, audio data, image data, and video data) without opening another application or window. In addition, the view application also allows the users to view metadata of the collaboration object (e.g., owner's information, time stamp, etc.).

In some embodiments, the viewer application that displays the selected content also includes a link to the original document or website from which the content is selected, such that if so desired, the other users can open the original document or website to view the entire document. In these embodiments, when a user indicates within the activity stream the desire to view the source document (e.g., by clicking on a button on the website that presents the activity stream), the activity stream will launch a separate viewer application that presents the source document according to the embedded programming code.

As mentioned above, in some of these embodiments, the collaboration object associated with the selected content includes collaboration point links that indicate, not only the location of the source document, but also the location within the source document at which the content is selected (e.g., coordinates (x,y) of a two-dimensional coordinate system, paragraph number, etc.). In these embodiments, when the user selects the link in the entry (e.g., by clicking on the link), or when they click on a button or image which activates the link, the source document will be opened using the embedded document viewer application and the relevant portion of the document (e.g., the portion of the document from which the content is selected) will be automatically displayed to the user.

It is contemplated that these activity stream hosts 155, 160, and 165 allow multiple users to collaborate on different subjects (entries) within the activity streams. For example, when a user posts content (e.g., a status, a document, an image, an audio/video file, etc.) to an activity stream as a new entry, other authorized users (e.g., subscribers) can contribute to the posted subject by providing comments in response to the posted content and/or edits (e.g., highlighting, adding new data, deleting data, etc.) to the posted content. The user who publishes the entry can also determine which other users can have access to this entry by providing access control information. In some embodiments, the user 150 can provide access control information to the collaboration management engine 105 through the user interface 120. The collaboration management module 110 can store the access control information within the collaboration object associated with the selected content so that the information will be included in the activity stream data when the collaboration management module 110 sends the integrated activity stream data to the hosts for publishing.

In some embodiments, once a user opens the source document from the entry using the viewer application, the viewer application also allows the user to select (or clip) another portion of the document (that is different from the content selected by user 150) to publish within that entry. For example, when a user who is contributing to the entry feels that another portion of the source document is relevant to the subject that is being discussed in the entry, the user can clip that other portion of the source document, and make a comment about the other portion of the document, all within the same entry of the activity stream.

In addition to viewing the source document and clipping different portions of the document within the entry, the viewing application of some embodiments also allow the users to edit the selected content that is published in the entry. As mentioned above, the collaboration object associated with a selected content is a separate entity from the source document and the content of the source document, such that modifications performed with the collaboration object will not affect the source document itself. Furthermore, the source document might not even be editable (read-only) in some instances. Therefore, in some embodiments, the collaboration management engine 105 inserts a copy of the content (e.g., text extracted from character recognition, audio extraction, video extraction, image extraction, etc.) as the selected content 215 within the collaboration object 205. In these embodiments, the viewer application embedded in the activity stream entry is configured to not only display the content, but also includes a content editor (e.g., widget) that allows users to edit the content copy. Thus, users who have access to the message that displays the content can use the content editor to add words/phrases to, remove words/phrases from, and highlight certain words/phrases of the content within the activity stream entry.

In some embodiments, the viewer application embedded in the entry is also configured to display other content (e.g., sponsorship data, advertisement data, etc.) before displaying the selected content on the activity stream. In some of these embodiments, the sponsorship/advertisement content includes animated content.

As mentioned above, users of the activity stream hosts can subscribe to the respective activity streams in which the entry is being inserted. The user subscription information can be included within the activity stream data in some embodiments. Thus, it is also contemplated that the collaboration engine 105 can be configured to send users who have subscribed to the activity streams (e.g., subscribers) e-mails regarding new entries that are published on the activity stream. In these embodiments, the collaboration engine 105 is also configured to allow a subscriber to edit the content with a reply e-mail, and to edit the collaboration object according to the edits upon receiving the e-mail from the subscriber.

Since new information (e.g., comments, new edits to the selected content, etc.) can be added to the published entry from time to time by different users via the one or more activity streams, once an entry associated with the collaboration object is published in the one or more activity streams, the collaboration management engine 105 is configured to receive updated activity stream data in order to update the collaboration objects.

In some embodiments, the collaboration engine 105 is configured either to receive the activity stream data from the hosts 155, 160, and 165 on a periodic basis (e.g., every few seconds, every 5 minutes, every hour, etc.) or to instruct the activity stream hosts 155, 160, and 165 to push the activity stream data to the collaboration engine 105 whenever there is new activities (e.g., new comments, new edits, etc.) for the entry.

When the collaboration management module 110 receives activity stream data from any one of the activity stream hosts 155, 160, and 165, the collaboration management module 110 again uses the formatting modules 140 to identify the activity stream data format of the activity stream data. When the activity stream data indicates that the published entry has been modified (e.g., a user has edited the content, a user has added a comment/tag, etc.), the collaboration management module 110 sends the activity stream data to the modification module 125 to modify the collaboration object associated with the content. The modification module 125 modifies the collaboration object according to the activity stream data. In some embodiments, the collaboration management module 110 also identifies the point at which the entry is located within the activity stream. The identified point will be used later as the integration point of the modified entry.

For example, when the activity stream data indicates that a user has added a new comment to the activity stream entry, the modification module 125 will add an annotation to the collaboration object 205 and associate the new annotation with a new collaboration point link that point to the same selected content. On the other hand, when the activity stream data indicates that a user has added a new comment that refers to another portion of the source document (e.g., the user has clipped another portion of the source document using the viewer application and made a comment about the newly clipped portion), the modification module 125 will add an annotation to the collaboration object 205 and associate the new annotation with a new collaboration point link that point to the newly clipped portion of the source document.

When the activity stream data indicates that the user has edited the selected content via the viewer application (e.g., adding data, removing data, highlighting data, etc.), the modification module 125 will insert a new collaboration point link that point to the text being edited, store the tracked changes to the selected content as metadata, and associate the new collaboration point link with the stored tracked changes. This way, the collaboration object keeps track of all edits performed by different users on the one or more activity streams.

In the event that multiple users provide conflicting edits to the entry (e.g., replacing the same word in the content with different words) via different activity streams at or around the same time, the modification module 125 is configured to resolve the conflict according to some rules. In some embodiments, the modification module 125 automatically resolves the conflict by assigning priorities to different users or different types of edits. For example, the collaboration management engine 105 of some embodiments can allow the user 150 to assign priorities, in addition to access right levels, to different users via the user interface 120. In other embodiments, the modification module 125 can notify the user 150 about the conflict via the user interface 120 so that the user 150 can manually resolve the conflict.

After the modification module 125 has properly modified the collaboration object based on the updated activity stream data, the collaboration management module 110 requests the formatting modules 140 to convert the updated collaboration object into object data according to the identified activity stream format. The collaboration management module 110 then uses the integration module to insert the formatted collaboration object data into the activity streams at the previously identified integration points. Similar to the scenario above, the integration point can be automatically identified by the collaboration engine 110 based on the stream data or be manually identified by the user 145. In either case, the collaboration engine 110 sends the updated activity stream data back to the host.

In some embodiments, the collaboration engine 110 also updates other activity streams using the same method described above.

In some embodiments, the viewer application that is embedded in the entry is configured to render a formatted collaboration object in a manner that can be presented to the user 145 and other collaborators. The rendering of the formatted collaboration object can be done in a similar way as Microsoft Word®'s track changes functionalities. For example, words that are deleted from the content can be presented with a strike-over line, words that are added to the content can be presented with an underline, etc.

In some embodiments, the collaboration engine 105 can instruct the activity stream host to launch the viewer application when presenting the entry within the activity stream the content can be presented with all the tracked changes within the activity stream.

Figure 3:
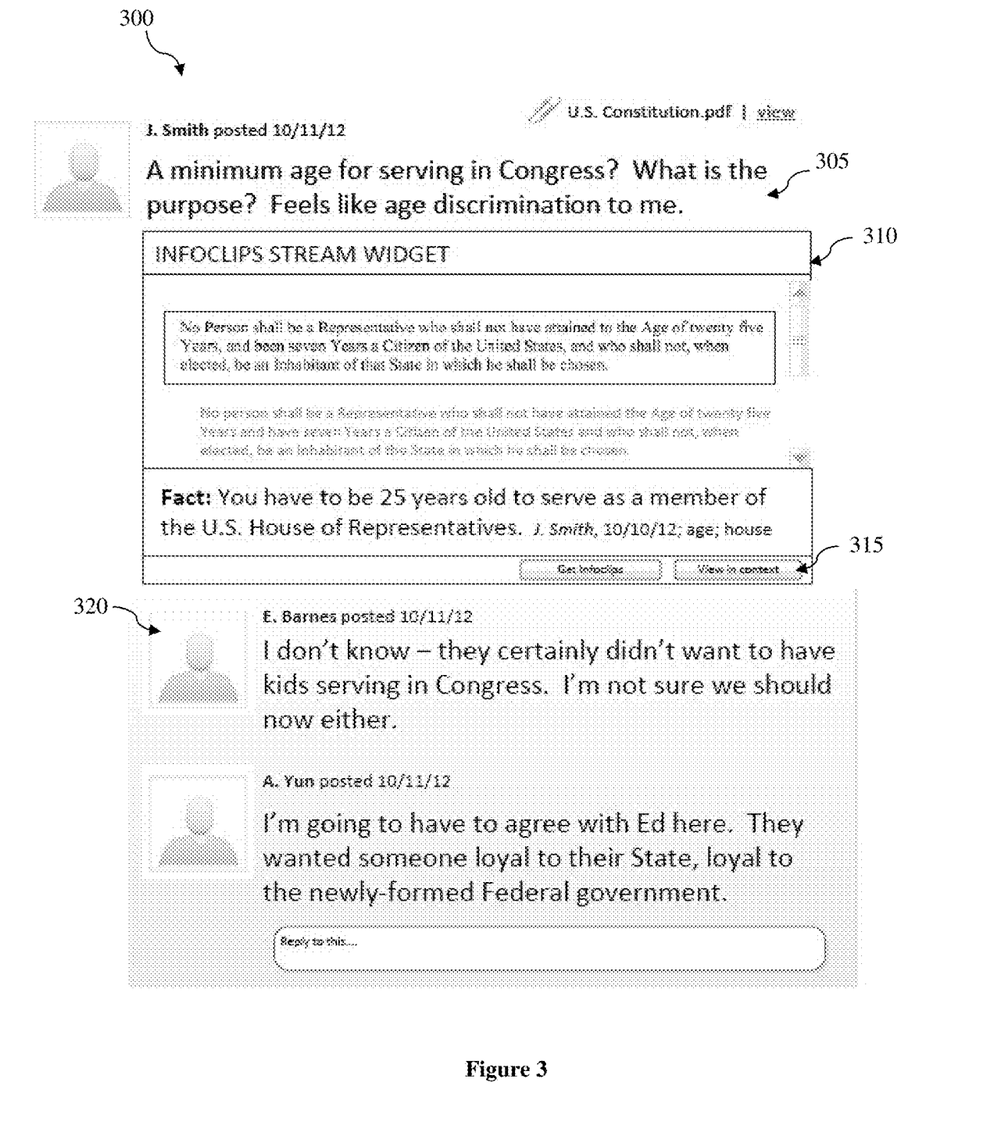
FIG. 3 illustrates an insertion of a collaboration object into an activity stream.

FIG. 3 illustrates an example entry 300 that is rendered to be presented as part of an activity stream. The entry 300 includes a title section 305 that displays a title of the entry created by the owner of the entry. The entry 300 also includes an area for presenting the widget 310. The widget 310 is part of the viewer application that allows the user to view and edit content of the entry. As shown, the widget 310 also includes a button 315 that allows the user to select to open the source document for the entry in a separate viewer. In addition, the entry also includes area 320 that displays existing comments for this entry and allows users to add new comments.

Figure 4:
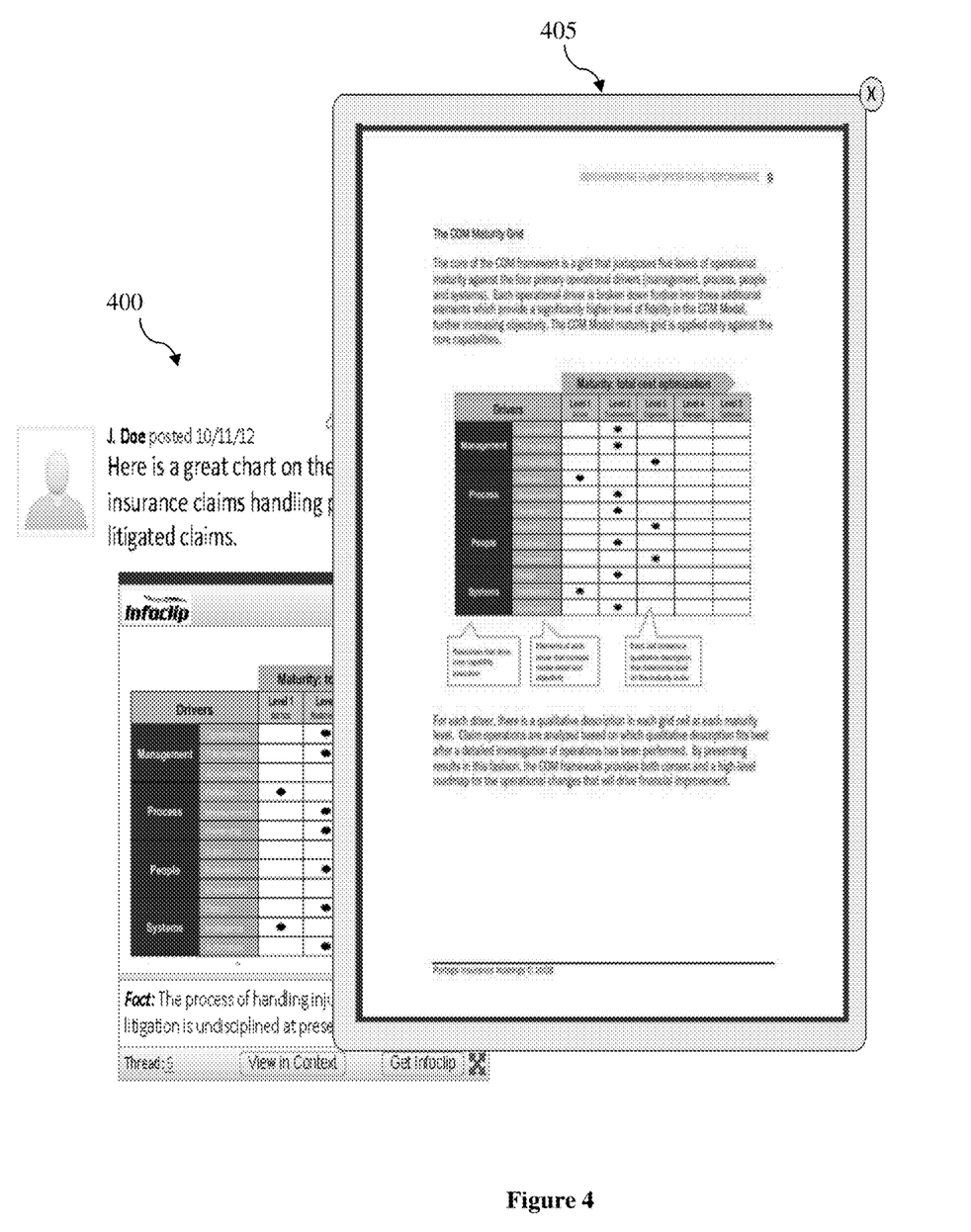
FIG. 4 illustrates accessing annotation source material from an activity stream.

FIG. 4 illustrates a feature of some aspect of the invention that provides a "quick view" of the source document to the user within the activity stream. In this figure, an entry 400 that is associated with a collaboration object is presented within an activity stream. In response to a trigger or event (e.g., the user selects a user interface item such as a button within the entry, the user hovers over a user interface item on the message, etc.), a separate window 405 will automatically pops up that displays the portion of the source document selected for the collaboration object (i.e., the portion of the document from which the content is selected) in order to provide a quick preview of the source document of the user, without opening up another application.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A collaboration management computer system comprising software instructions stored on a computer readable non-transitory medium that, when executed by a processor of the collaboration management computer system, instantiate:a collaboration database configured to store a plurality of collaboration objects;
   a user interface configured to communicate with a user;
   an activity stream interface configured to acquire first activity stream data representative of a first activity stream external to the collaboration management system; and
   a collaboration engine coupled with the collaboration database, the user interface, and the activity stream interface, and configured to:
      receive, from a first user via the user interface, a first annotation event comprising a first annotation and a selection of a first portion of content from a read-only source document, wherein the event further comprises a first request to publish the first annotation in the first activity stream;
      instantiate, in response to the first annotation event, a first unformatted collaboration object that is separate from the read-only source document, the first unformatted collaboration object comprising a first pointer to the source document, a copy of the first portion of content, and a first collaboration point link that points to a first location within the source document that corresponds to the first portion of content, and the first annotation;
      store the first unformatted collaboration object in the collaboration database;
      retrieve the first activity stream data via the activity stream interface;
      identify a first activity stream format from the first activity stream data;
      locate a first integration point within the first activity stream based on the first activity stream data and the first unformatted collaboration object;
      format the first unformatted collaboration object according to the first activity stream format to form a first formatted collaboration object;
      integrate the first formatted collaboration object, via the activity stream interface, into the first activity stream according to the first integration point;
      receive, from a second user via the activity stream interface, a second request to view the source document associated with the first formatted collaboration object;
      retrieve the read-only source document based on the request and present the read-only source document to the second user via the user interface;
      receive, from the second user via the user interface, a second annotation event comprising a second annotation and a selection of a second portion of content from the read-only source document different from the selection of the first portion of content from the read-only source document;
      instantiate, in response to the second annotation event, a second unformatted collaboration object that is separate from the read-only source document, the second unformatted collaboration object comprising a second pointer to the read-only source document, a copy of the second portion of content, and a second collaboration point link that points to a second location within the read-only source document that corresponds to the second portion of content, and the second annotation;
      store the second unformatted collaboration object in the collaboration database;
      retrieve the first activity stream data via the activity stream interface;
      locate a second integration point different from the first integration point within the first activity stream based on the first activity stream data and the second unformatted collaboration object;
      format the second unformatted collaboration object according to the first activity stream format to form a second formatted collaboration object; and
      integrate the second formatted collaboration object, via the activity stream interface, into the first activity stream according to the second integration point.

2. The system of claim 1, wherein the activity stream interface is configured to acquire second activity stream data representative of a second activity stream, the collaboration engine is further configured to:
   receiving a third request, from the first user via the user interface, to publish at least one of the first unformatted collaboration object and the first formatted collaboration object in the second activity stream;
   retrieve the second activity stream data via the activity stream interface;
   identify a second activity stream format from the second activity stream data;
   locate a third integration point within the second activity stream based on the second activity stream data and the at least one of the first unformatted collaboration object and the first formatted collaboration object;
   format the at least one of the first unformatted collaboration object and the first formatted collaboration object according to the second activity stream format to form a third formatted collaboration object; and integrate the third formatted collaboration object, via the activity stream interface, into the second activity stream according to the third integration point.

3. The system of claim 1, wherein the collaboration engine is further configured to:
  update the first formatted collaboration object based on user interaction with the first activity stream;
  retrieve the first activity stream data;
  locate a third integration point within the first activity stream based on the first activity stream data and the updated first formatted collaboration object;
  format the updated first formatted collaboration object according to the first activity stream format to form a third formatted collaboration object; and
  integrate the third formatted collaboration object, via the activity stream interface, into the first activity stream according to the third integration point.

4. The system of claim 1, wherein the first activity stream has an activity stream user interface that is different from the user interface of the collaboration management system.

5. The system of claim 1, wherein the first activity stream data includes a set of updated metadata of the first formatted collaboration object after integrating the first formatted collaboration object into the first activity stream data according to the second integration point.

6. The system of claim 1, wherein the collaboration engine is further configured to update a set of metadata of the first formatted collaboration object.

7. The system of claim 1, wherein a set of metadata of the first formatted collaboration object includes at least one of an annotation for a link, a time stamp, owner data, rights data, and collaborator data.

8. The system of claim 1, wherein the first collaboration point link of the first formatted collaboration object includes at least one of a URL, an IP address, a file name, an object reference, a GUID, a DOI, a link that directs a user to the first portion of content within the source document.

9. The system of claim 8, wherein the copy of the first portion of content stored within the first formatted collaboration object is read only.

10. The system of claim 8, wherein the first collaboration point link comprises a coordinate that specifies a boundary within the source document.

11. The system of claim 1, wherein the first activity stream comprises at least one of a forum, a message flow, a comment section of a forum, a project management application, a revision control application, an online document, and a web site.

12. The system of claim 1, wherein the collaboration engine comprises a collaboration object viewer.

13. The system of claim 12, wherein the collaboration object viewer is configured to render data of the first formatted collaboration object without retrieving the source document.

14. The system of claim 12, wherein the collaboration engine is further configured to launch the collaboration object viewer based on the activity stream data.

15. The system of claim 1, wherein the collaboration engine comprises at least one of an mobile phone application, a computer application, a mobile phone program, a computer program, a cell phone, a tablet, a computer, and a web browser.

16. The system of claim 1, further comprising a collaborator interface is configured to allow multiple collaborators to access at least one of the first formatted collaboration object and the second formatted collaboration object.

17. The system of claim 1, wherein the first formatted collaboration object comprises at least one of sponsorship data and advertisement data.

* * * * *